(12) United States Patent
Tiwari et al.

(10) Patent No.: US 10,547,399 B2
(45) Date of Patent: Jan. 28, 2020

(54) GENERALISED FFT-IFFT STRUCTURE BASED FREQUENCY DIVISION MULTIPLEXING TRANSCEIVER

(71) Applicant: INDIAN INSTITUTE OF TECHNOLOGY, KHARAGPUR, West Bengal (IN)

(72) Inventors: Shashank Tiwari, West Bengal (IN); Suvra Sekhar Das, West Bengal (IN)

(73) Assignee: INDIAN INSTITUTE OF TECHNOLOGY, KHARAGPUR, West Bengal (IN)

( * ) Notice: Subject to any disclaimer, the term of this patent is extended or adjusted under 35 U.S.C. 154(b) by 13 days.

(21) Appl. No.: 15/926,041

(22) Filed: Mar. 20, 2018

(65) Prior Publication Data
US 2019/0190634 A1 Jun. 20, 2019

(30) Foreign Application Priority Data
Dec. 16, 2017 (IN) .............................. 201731045300

(51) Int. Cl.
| | |
|---|---|
| H04J 1/12 | (2006.01) |
| H04L 27/26 | (2006.01) |
| H04B 1/38 | (2015.01) |
| H04L 5/00 | (2006.01) |

(52) U.S. Cl.
CPC ............ *H04J 1/12* (2013.01); *H04L 27/2628* (2013.01); *H04B 1/38* (2013.01)

(58) Field of Classification Search
None
See application file for complete search history.

(56) References Cited

PUBLICATIONS

Tiwari, "Precoded generalised frequency division multiplexing system to combat inter-carrier interference: performance analysis", 2015 (Year: 2015).*
Farhang, "Low Complexity Transceiver Design for GFDM", 2015 (Year: 2015).*
Stewart, "Computationally Attractive Real Gabor Transforms", 1995 (Year: 1995).*

* cited by examiner

*Primary Examiner* — Kodzovi Acolatse
*Assistant Examiner* — Jay L Vogel
(74) *Attorney, Agent, or Firm* — The PL Law Group, PLLC

(57) ABSTRACT

A generalized frequency division multiplexing (GFDM) transceiver system includes a low complex GFDM transmitter with multiple sub-carriers and timeslots having IFFT based modulator for modulating data corresponding to a particular timeslot and different sub-carriers to corresponding sub-carrier frequencies and thereby generating transmittable GFDM data signal, multipath frequency selective fading GFDM channel having uncorrelated channel coefficients corresponding to different paths for transmitting the modulated GFDM data signal and a low complex GFDM receiver configured to operate with said multipath frequency selective fading channel involving channel equalization followed by self-interference equalization to receive the transmitted modulated GFDM data signal and thereby de-modulate the GFDM data signal to obtain the data.

7 Claims, 12 Drawing Sheets

$N \in \{32, 128, 512\}, M = 3$ and $\text{ROF} \in \{0.1, 0.9\}$ $M \in \{3, 11, 21\}, N = 16$ and ROF $\in \{0.1, 0.9\}$ $N = 32$, $M = 7$ and ROF = 0.5.

$N = 64, M = 5, 15$ and SNR $= 10$ dB (a) Roll off Factor : 0.3

(b) Roll off Factor : 0.9

GENERALISED FFT-IFFT STRUCTURE BASED FREQUENCY DIVISION MULTIPLEXING TRANSCEIVER

CROSS-REFERENCE TO RELATED APPLICATION(S)

This application claims the benefit under 35 USC § 119(a) of Indian Patent Application No. 2017-31045300, filed on Dec. 16, 2017, in the Indian Intellectual Property Office, the entire disclosure of which is incorporated herein by reference for all purposes.

BACKGROUND

Field of the Invention

The present invention relates to Generalized Frequency Division Multiplexing (GFDM). More specifically, the present invention is directed to develop a GFDM transceiver with least computational complexity facilitating implementation of cheap and fast GFDM based communication infrastructure. The present GFDM transceiver can strengthen 5G waveform candidature of the GFDM as it reduces cost of the GFDM based modem and also increases the processing speed (which reduces overall latency).

Background of the Invention

The fifth generation (5G) communication systems aim to cater to a wide range of application with varied requirements [Ref J. G. Andrews et al., "*What Will 5G Be?,*" *IEEE Journal on Selected Areas in Communications* 32, no. 6 (June 2014): 1065-82]. Orthogonal Frequency Division Multiplexing (OFDM), has been the celebrated waveform for fourth generation (4G) cellular systems due to its low complexity implementation and frequency selective channel combating feature. However, it is shown to fall behind in terms of 5G waveform requirements, such as, very low out of band (OoB) emission, low latency, immunity to carrier frequency offset (CFO) [Ref: P. Banelli et al., "*Modulation Formats and Waveforms for 5G Networks: Who Will Be the Heir of OFDM?: An Overview of Alternative Modulation Schemes for Improved Spectral Efficiency,*" *IEEE Signal Processing Magazine* 31, no. 6 (November 2014): 80-93]. In recent years, many new waveforms have been suggested for 5G and GFDM [Ref N. Michailow et al., "*Generalized Frequency Division Multiplexing for 5th Generation Cellular Networks,*" *IEEE Transactions on Communications* 62, no. 9 (September 2014): 3045-61] is one the main contenders among many candidate waveforms for 5G.

GFDM is a block-based waveform which encompasses multiple time and frequency slots. Circular pulse shaping is used to restrict the signals length within its duration and enable the use of cyclic prefix (CP) for combating frequency selective wireless channel. Furthermore, GFDM is shown to have better OoB characteristics than OFDM and can achieve even excellent OoB characteristics with the use of time domain windowing without any spectral efficiency loss, which qualifies it to be a contending waveform for cognitive radio applications.

The GFDM receivers in multipath channel can be broadly categorized as (a) two-stage receiver [Ref: N. Michailow et al., "*Bit Error Rate Performance of Generalized Frequency Division Multiplexing,*" in 2012 *IEEE Vehicular Technology Conference (VTC Fall)*, 2012, 1-5] and (b) one-stage receiver [Ref: Matthe et al., "*Reduced Complexity Calculation of LMMSE Filter Coefficients for GFDM.*"]. In a two-stage receiver, channel equalization is followed by GFDM demodulation, while in the one stage receiver, the effect of channel and GFDM modulation is jointly equalized. In the two stage GFDM receiver, channel equalization can be implemented using low computational load. The second stage, which is a self-interference equalizer, can be implemented using linear or non-linear receiver.

If M and N represent number of time and frequency slots respectively in GFDM based communication, the implementation of the transmitter, Matched Filter (MF) receiver (self-interference equalizer) and Zero-Forcing (ZF) receiver (self-interference equalizer) involves a complexity of $O(M^2N^2)$ [Ref: Shashank Tiwari, Suvra Sekhar Das, and Kalyan Kumar Bandyopadhyay, "*Precoded Generalised Frequency Division Multiplexing System to Combat Inter-Carrier Interference: Performance Analysis,*" *IET Communications*, Sep. 10, 2015,] while the complexity of Minimum Mean Square Error (MMSE) receiver (self-interference equalizer) is $O(M^3N^3)$. When $N \sim 10^3$s and $M \sim 10$s, the count of computations becomes very high. This high complexity hinders practical implementation of GFDM transceivers. It is known that the Joint-MMSE receiver outperforms two-stage receivers [Ref: Michailow et al., "*Generalized Frequency Division Multiplexing for 5th Generation Cellular Networks.*"]. Despite good BER properties, Joint-MMSE receiver is the most complex linear receiver for constituting GFDM receiver since it involves large matrix multiplications, inversion and $O(M^3N^3)$ computations.

Some attempts to reduce the complexity of GFDM transmitter and two stage receiver is reported in the past. The sparsity of prototype pulse shape in frequency domain is exploited to design a low complexity transmitter in N. Michailow et al [Ref: N. Michailow et al., "*Generalized Frequency Division Multiplexing: Analysis of an Alternative Multi-Carrier Technique for next Generation Cellular Systems,*" in 2012 *International Symposium on Wireless Communication Systems (ISWCS)*, 2012, 171-75,] and a low-complexity MF receiver in I. Gaspar et al. [Ref: I. Gaspar et al., "*Low Complexity GFDM Receiver Based on Sparse Frequency Domain Processing,*" in *Vehicular Technology Conference (VTC Spring)*, 2013 IEEE 77th, 2013, 1-6,]. The complexity is reduced to $O(MN \log_2 (MN)+MN^2)$ but it comes with increase in BER. Behrouz and Hussein proposed frequency spreading based GFDM transmitter in Behrouz Farhang-Boroujeny et al [Ref: Behrouz Farhang-Boroujeny and Hussein Moradi, "*Derivation of GFDM Based on OFDM Principles,*" in 2015 *IEEE International Conference on Communications (ICC)*, 2015, 2680-85] based on the principles of frequency spreading filter bank multi carrier (FMBC) transmitter proposed in M. Bellanger [Ref: M. Bellanger, "*Physical Layer for Future Broadband Radio Systems,*" in 2010 *IEEE Radio and Wireless Symposium (RWS)*, 2010, 436-39,]. The complexity of the transmitter is $O(MN \log_2(N)+M^2N)$. Periodicity of complex exponential is exploited in Hao Lin et al [Ref: Hao Lin and Pierre Siohan, "*Orthogonality Improved GFDM with Low Complexity Implementation,*" in 2015 *IEEE Wireless Communications and Networking Conference (WCNC)*, 2015, 597-602,] and Maximilian Matthé et al. [Ref: Maximilian Matthé et al., "*Precoded GFDM Transceiver with Low Complexity Time Domain Processing,*" *EURASIP Journal on Wireless Communications and Networking* 2016, no. 1 (May 25, 2016): 1] to attain $O(MN \log_2(N)+M^2N)$ complexity of GFDM transceivers. Similar order of complexity is achieved by using block circulant property of multiplication of modulation matrix and its Hermitian in A. Farhang et al [Ref: A.

Farhang, N. Marchetti, and L. E. Doyle, "*Low-Complexity Modem Design for GFDM,*" *IEEE Transactions on Signal Processing* 64, no. 6 (March 2016): 1507-18].

Some attempts to reduce the complexity of Joint-MMSE receiver also have been reported in the recent past, there is either limited gain achieved or complexity gain is traded off with BER loss. Matthe et. al. [Ref: Matthe et al., "*Reduced Complexity Calculation of LMMSE Filter Coefficients for GFDM*] exploited the block circulant property of the modulation matrix to achieve the complexity of O(MN² log M). Authors in M. Matthe, D. Zhang, and G. Fettweis," *Iterative Detection Using MMSE-PIC Demapping for MIMO-GFDM Systems,*" *in European Wireless* 2016; 22*th European Wireless Conference*, 2016, 1-7 have exploited the sparsity of prototype pulse in the frequency domain to achieve the complexity of O(M³N). Recently, authors in Zhang et al., "*A Study on the Link Level Performance of Advanced Multicarrier Waveforms Under MIMO Wireless Communication Channels,*" *IEEE Transactions on Wireless Communications* 16, no. 4 (April 2017): 2350-65, have computed MMSE equalization of FFT of data vectors while exploiting the sparsity of prototype pulse in the frequency domain to achieve the complexity of O(MN log₂ MN).

It is thus there has been a need for developing a new simple GFDM transceiver by reducing the complexity of the GFDM transceiver without any significant loss in the BER performance.

It is thus basic object of the present invention is to develop a GFDM transceiver which would have the least computational complexity when compared with other GFDM transceiver structures without exhibiting any significant loss in the BER performance.

Another object of the present invention is to develop a GFDM transceiver which would enable implementation of GFDM based communication cheaper in terms of cost and faster in terms of processing speed.

Another object of the present invention is to develop a GFDM transceiver which would include digital signal processing blocks such as Fast Fourier Transform (FFT), Multiplier, Adder and like having a novel interaction there between for providing a novel signal propagation path from one end to the other end.

Yet another object of the present invention is to develop a GFDM transceiver which would be adapted to implement GFDM based communication in fifth generation cellular systems, machine-type communication, Internet of Things (IOT), Tactile Internet, Cognitive Radio etc.

SUMMARY

Thus, according to the basic aspect of the present invention there is provided a generalized frequency division multiplexing (GFDM) transceiver system comprising low complex GFDM transmitter with multiple sub-carriers and timeslots having IFFT based modulator for modulating data corresponding to a particular timeslot and different sub-carriers to corresponding sub-carrier frequencies and thereby generating transmittable GFDM data signal;

multipath frequency selective fading GFDM channel having uncorrelated channel coefficients corresponding to different paths for transmitting the modulated GFDM data signal; and low complex GFDM receiver configured to operate with said multipath frequency selective fading channel involving channel equalization followed by self-interference equalization to receive the transmitted modulated GFDM data signal and thereby de-modulate the GFDM data signal to obtain the data.

In a preferred embodiment of the present generalized frequency division multiplexing (GFDM) transceiver system, the low complex GFDM transmitter includes N-point IFFT operator to receive the data corresponding to a particular timeslot and different sub-carriers and modulate the same to corresponding sub-carrier frequencies;

means for shuffling physical connections in the N-point IFFT operator for grouping the modulated data to sub-carrier numbers, whereby, in each group, the data is converted into frequency domain using M-point FFT operator and multiplied with a precomputed weight and thereafter converted back into time domain by using M-point IFFT operator;

means for shuffling physical connections in the M-point IFFT operator for grouping the data according to time slots and generate transmittable GFDM data signal.

In a preferred embodiment of the present generalized frequency division multiplexing (GFDM) transceiver system, the low complex GFDM transmitter generated transmittable GFDM data signal is $$x[n] = \frac{1}{\sqrt{N}} \sum_{m=0}^{M-1} \sum_{k=0}^{N-1} d_{m,k} g[n - mN]_{MN} e^{\frac{j2\pi nk}{N}}$$

for N sub-carriers and M timeslots, where g(n), n=0, 1, ..., MN−1 is MN length filter response and $d_{m,k} \in C$, m=0, 1, ..., M−1, k=0, 1, ..., N−1 is QAM modulated data symbol.

In a preferred embodiment of the present generalized frequency division multiplexing (GFDM) transceiver system, the GFDM transmitted signal is critically sampled Inverse Discrete Gabor Transform (IDGT) of d by using the IDGT matrix factorization whereby Modulation Matrix, A can be given as, $$A = G \times U_N = \begin{pmatrix} \Psi_0 & \Psi_{M-1} & \cdots & \Psi_1 \\ \Psi_1 & \Psi_0 & \cdots & \Psi_2 \\ \vdots & \vdots & \ddots & \vdots \\ \Psi_{M-1} & \Psi_{M-2} & \cdots & \Psi_0 \end{pmatrix} \begin{pmatrix} W_N & & \\ & \ddots & \\ & & W_N \end{pmatrix}$$

where, $\Psi_m = \text{diag}\{g[mN], g[mN+1], \ldots, g[mN+N-1]\}$ for $0 \leq m \leq M-1$, is N×N diagonal matrix and $W_N$ is N×N normalized IDFT matrix In a preferred embodiment of the present generalized frequency division multiplexing (GFDM) transceiver system, the uncorrelated channel coefficients corresponding to different paths for transmitting the modulated GFDM data signal constitutes channel impulse response vector given as $h = [h_0, h_1, \ldots h_{L-1}]^T$ where L is channel length and $h_i$, for $0 \leq i \leq L-1$, represents complex baseband channel coefficient of $(i+1)^{th}$ path, which is assumed to be zero mean circular symmetric complex Gaussian whereby received vector of length $N_{CP} + NM + L - 1$ (for $N_{cp} \geq L$) is given by, $$Z_{cp} = h * X_{cp} + v_{cp}$$

where $v_{cp}$ is AWGN vector of length $MN + N_{CP} + L - 1$ with elemental variance $\sigma^2_v$.

In a preferred embodiment of the present generalized frequency division multiplexing (GFDM) transceiver system, the low complex GFDM receiver includes two staged receiver or Joint-MMSE Receiver whereby, the data obtained from the received GFDM data signal by involving channel equalization followed by self-interference equalization.

In a preferred embodiment of the present generalized frequency division multiplexing (GFDM) transceiver system, the two-staged receiver includes two staged receiver includes:

M-point FFT operator for grouping channel equalized received GFDM data signal according to sub-carrier numbers followed by converting samples of each group into frequency domain using the M-point FFT operator;

multiplying the converted samples with pre-computed weights by multiplier means;

converting back the multiplied samples into time domain by using M-point IFFT operator;

means for shuffling physical connections in the M-point IFFT operator for regrouping the converted samples according to time slots followed by converting samples of each group into frequency domain using N-point FFT operator;

multiplying the converted samples with pre-computed weights by multiplier means to obtain self-interference equalized data signal.

In a preferred embodiment of the present generalized frequency division multiplexing (GFDM) transceiver system, the joint-MMSE receiver includes MN-point FFT operator to convert the equalized received GFDM data signal into frequency domain;

means to multiply the received signal in frequency domain with complex valued channel information-based weights and then converting back to time domain using MN-point IFFT operator;

means for reshuffling the physical connections in the MN-point IFFT operator for grouping the time domain converted samples according to subcarrier number followed by converting the samples of each group into frequency domain using the M-point FFT operator;

multiplying the converted samples with pre-computed weights;

means for reshuffling the physical connections in the M-point FFT operator for regrouping the converted samples according to time slots followed by converting samples of each group into frequency domain using the N-point FFT operator;

processing the converted samples following Algorithm 1;

means for reshuffling the physical connections in the N-point FFT operator for regrouping the processed samples according to sub-carrier number followed by converting the samples of each group to time domain using the M-point IFFT operator;

multiplying the converted samples with complex weights computed using Algorithm 2;

means for reshuffling the physical connections in the M-point IFFT operator for regrouping the multiplied samples according to time slots to obtain equalized MN-point samples.

In a preferred embodiment of the present generalized frequency division multiplexing (GFDM) transceiver system, the Algorithm 1 enabling development of the low complexity receiver structure including low complexity multiplication to obtain $\rho = E\kappa$ using Taylor Series expansion.

In a preferred embodiment of the present generalized frequency division multiplexing (GFDM) transceiver system, the Algorithm 2 enabling development of the low complexity receiver structure including low complexity multiplication to obtain $\rho = E\kappa$ using CG method.

$$\frac{\|\Delta_u\|_F}{\|Z_u\|_F}$$

averaged over h and $u \in [0\ M-1]$ i.e. $\rho$ (in dB). (Raised Cosine (RC) pulse shape is considered).

Figure 6:
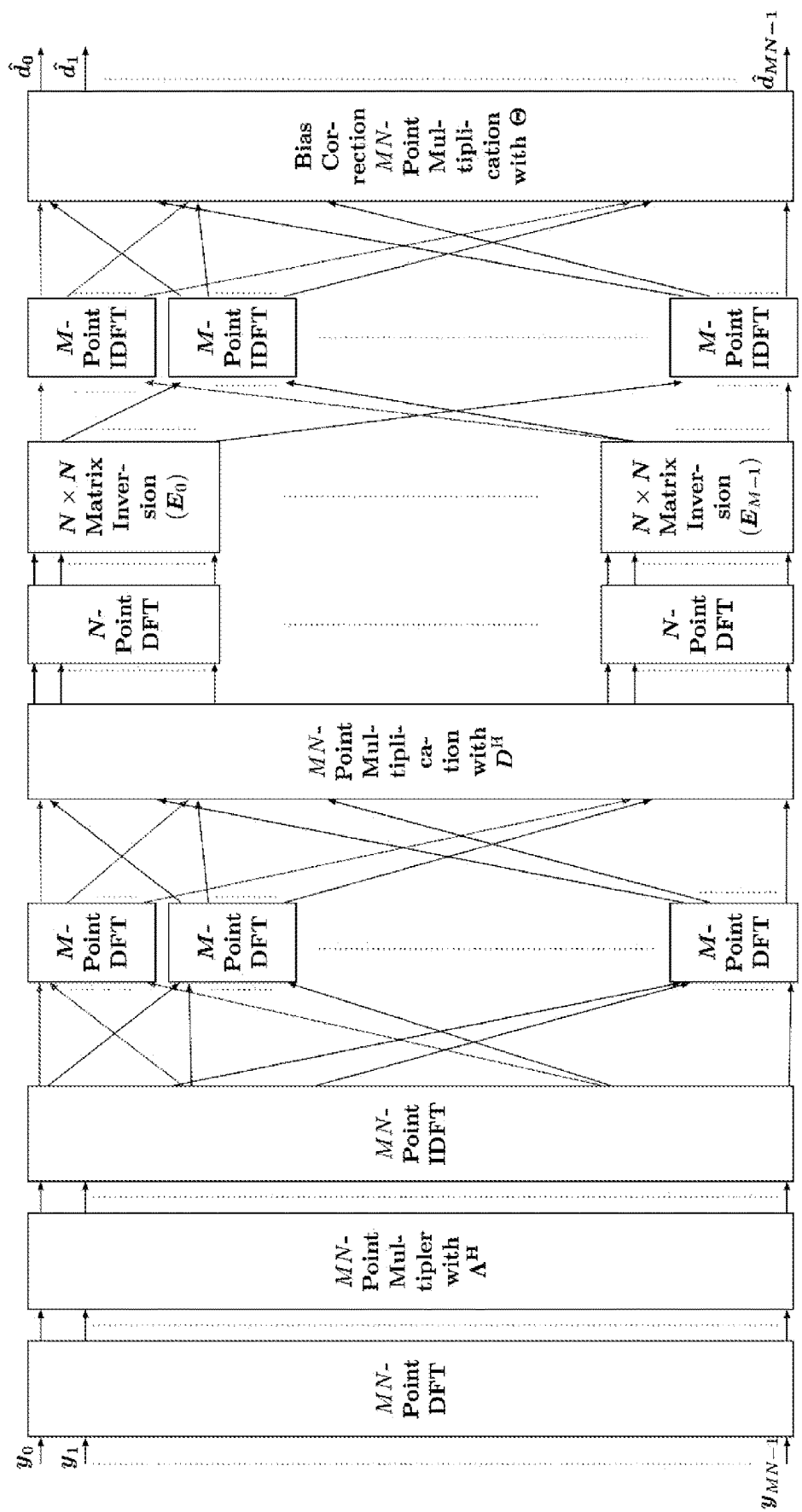

FIG. 6 shows implementation of present low-complexity joint-MMSE GFDM receiver in accordance with an embodiment of the present invention.

Figure 7:
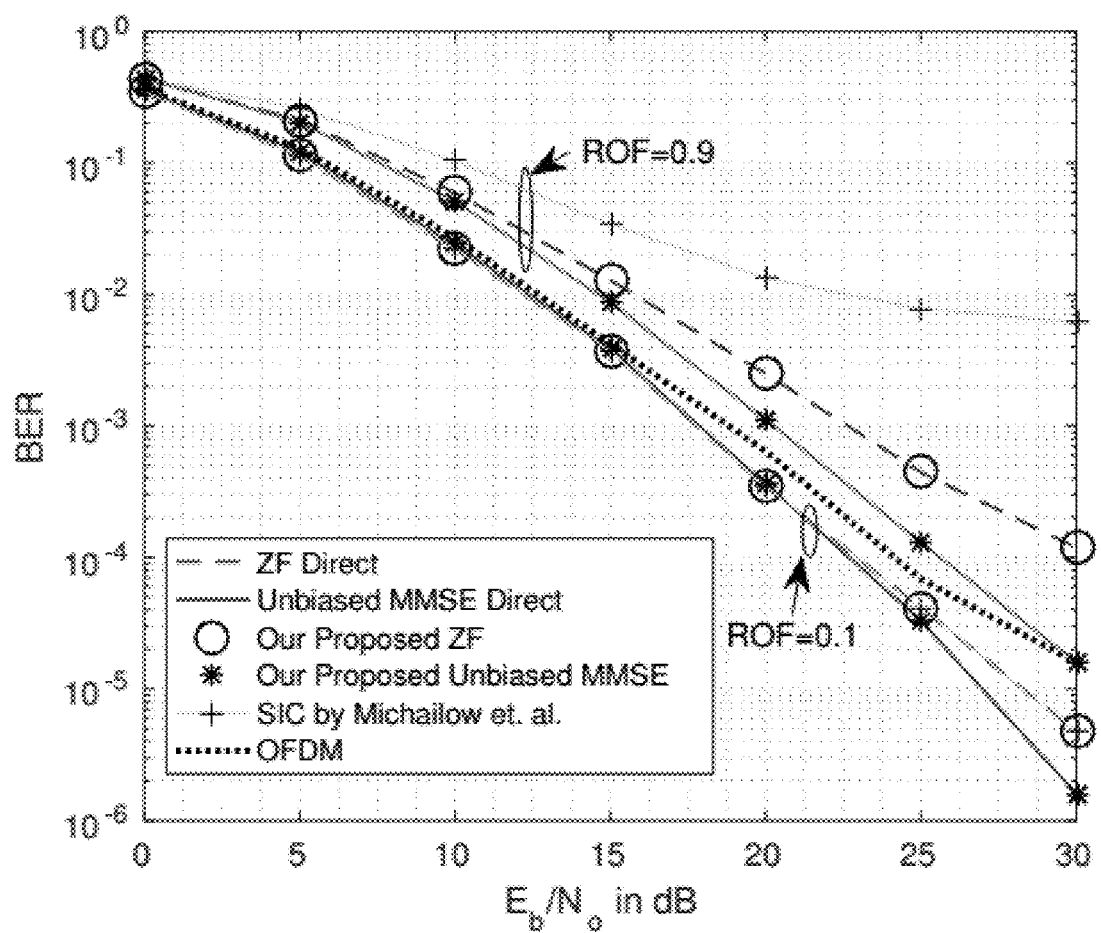

FIG. 7 shows BER Performance of proposed GFDM transceiver and direct implementation GFDM two stage transceiver for 16 QAM modulation in fading channel. N=128, M=8.

Figure 8A:
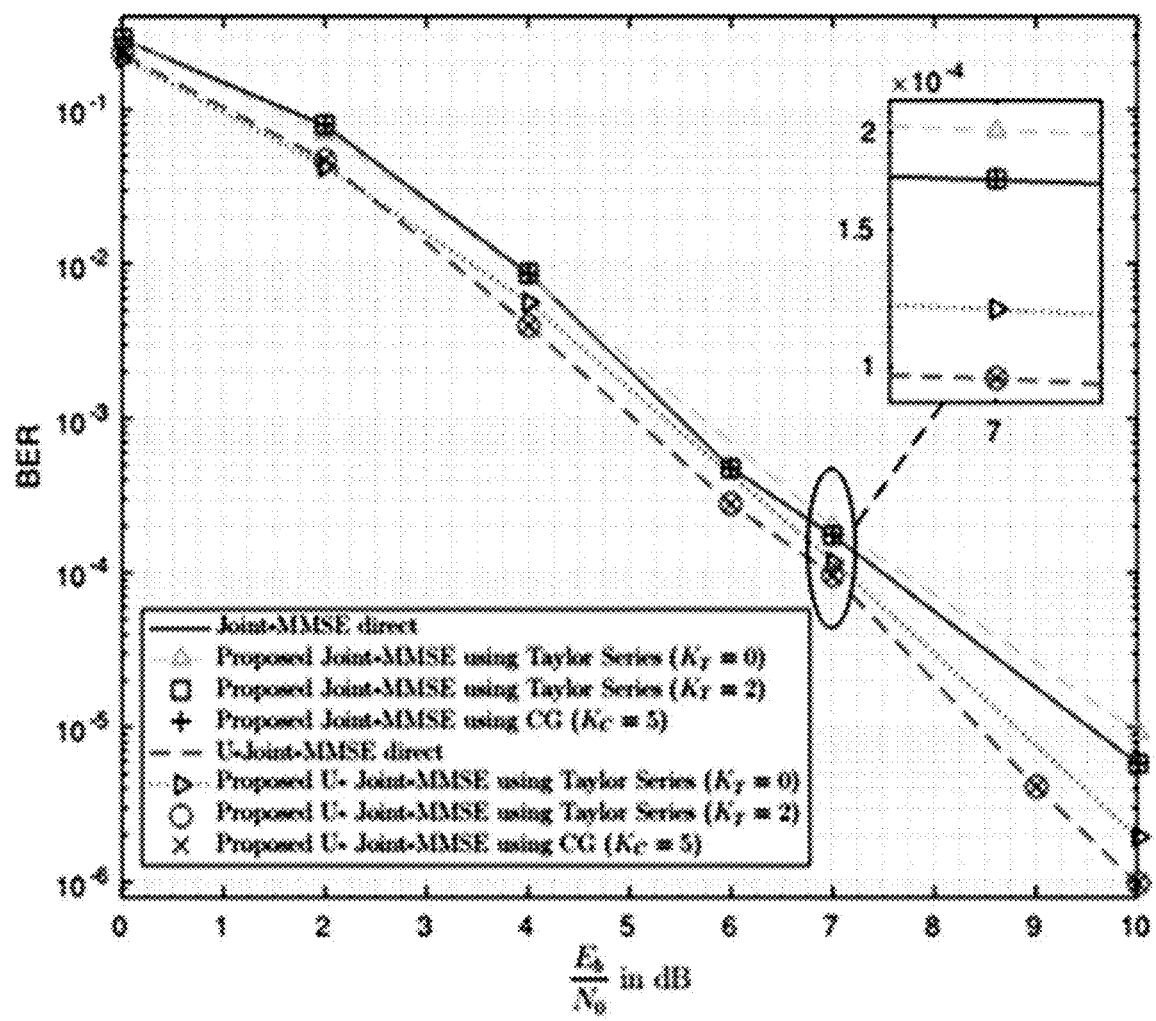
Figure 8B:
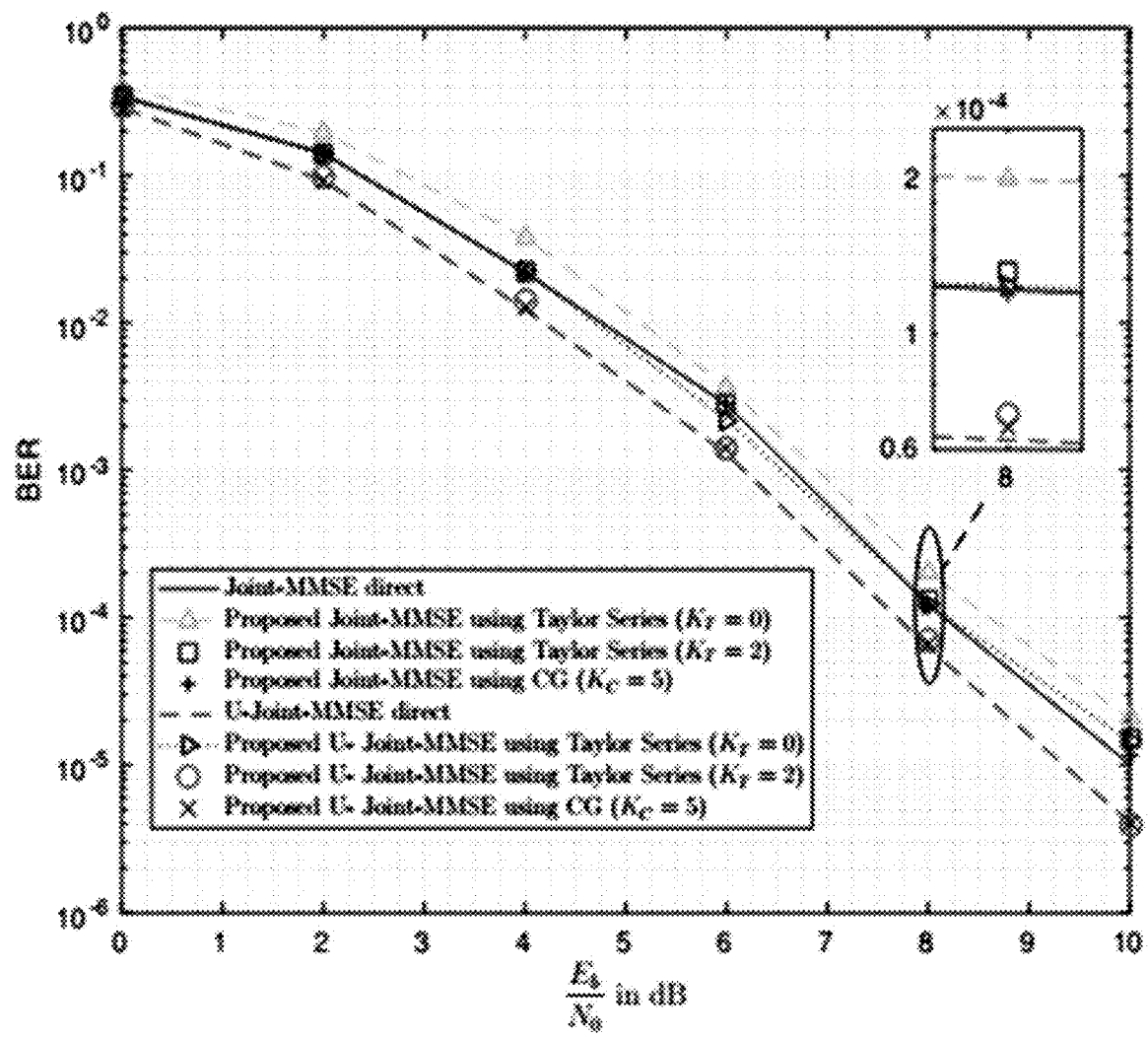

FIGS. 8A and 8B show BER Performance of proposed GFDM transceiver for (a) Roll off factor 0.3 and (b) Roll off factor 0.9.

DETAILED DESCRIPTION

In this specification, following notations are used. Vectors are represented by bold small letters (x), matrices are represented by bold capital letters (X) and scalars are represented as normal small letters (x). $I_N$ represents identity matrix with order N and $j=\sqrt{-1}$. $W_L$ represents L-order normalized IDFT matrix. Kronecker product operator is given by $\otimes$. diag{.} is a diagonal matrix whose diagonal elements are formed by the elements of the vector inside or diagonal elements of the matrix inside. circ{.} is a circulant matrix whose first column is given by the vector inside. $E_h\{.\}$ is expectation of expression inside with respect to random vector h. The round-down operator $*$. , rounds the value inside to the nearest integer towards minus infinity. The superscripts $(.)^T$ and $(.)^H$ indicate transpose and conjugate transpose operations, respectively.|.| operator computes absolute value of elements inside. trace{.} computes the trace of matrix inside. $\|.\|$ is Frobenous norm of matrix inside. $FFT_{(.)}$ and $IFFT_{(.)}$ denote (.)-point FFT and IFFT respectively.

Figure 1:
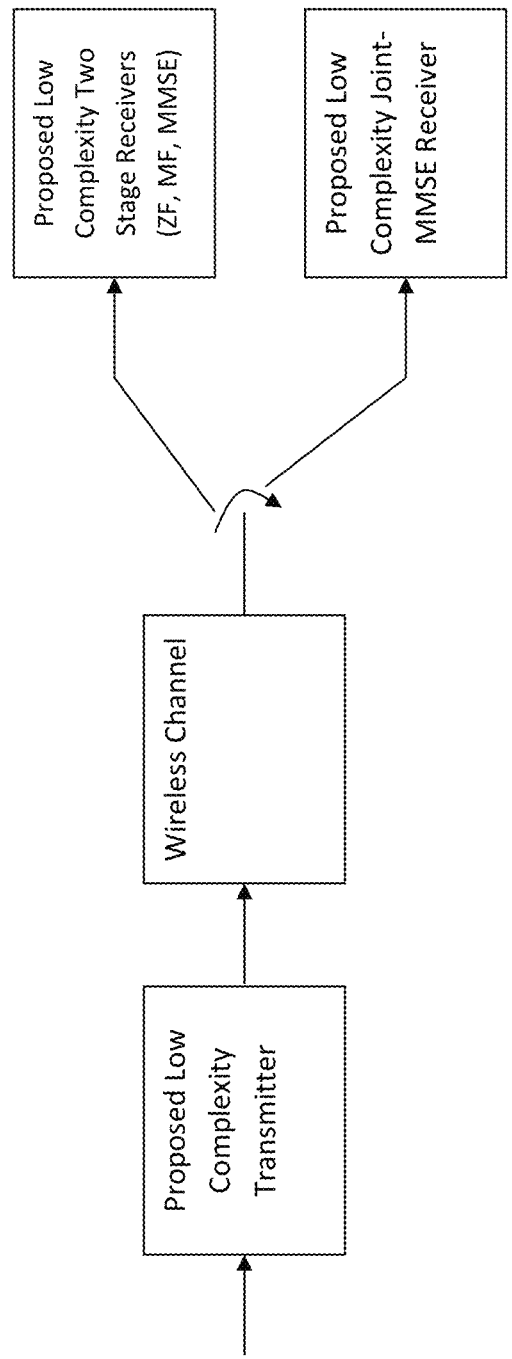
FIG. 1 shows a wireless communication system involving GFDM based transceiver in accordance with an embodiment of the present invention.
Figure 2:
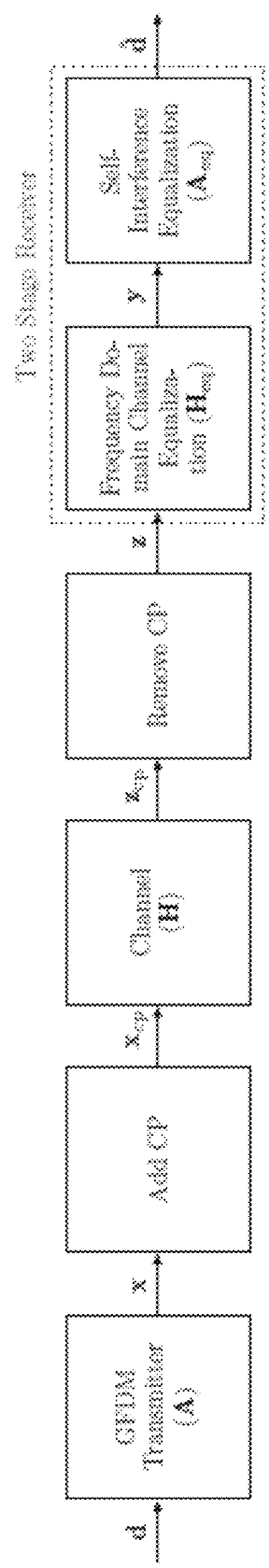
FIG. 2 shows baseband block diagram of GFDM Transceiver in multipath fading channel with two staged receiver in accordance with an embodiment of the present invention.

GFDM Transceiver System:

The accompanying FIG. 1 shows a block representation of the wireless communication system involving GFDM based transceiver in accordance with an embodiment of the present invention. As shown in the referred figure, the present transceiver system includes GFDM transmitter, wireless channel and GFDM receiver.

Transmitter:

The present invention discloses a GFDM system with N sub-carriers and M timeslots. The MN length prototype filter is g(n), n=0, 1, ..., MN−1. QAM modulated data symbol is $d_{m,k} \in C$, m=0, 1, ..., M−1, k=0, 1, ..., N−1. It is assumed that data symbols are independent and identical i.e. $E[d_{m,k}d_{m',k'}^*]=\sigma_d^2\delta_{m-m',k-k'}$. The transmitted GFDM signal can be written as, $$x[n] = \frac{1}{\sqrt{N}} \sum_{m=0}^{M-1} \sum_{k=0}^{N-1} d_{m,k} g[n-mN]_{MN} e^{\frac{j2\pi nk}{N}}. \tag{1}$$

The transmitted signal can also be written as, $$x = A_{MN \times MN} d_{MN \times 1}, \tag{2}$$

where $d = [d_0\ d_1\ \ldots\ d_{M-1}]^T$ is the data vector, where $d_m = [d_{m,0}\ d_{m,1}\ \ldots\ d_{m,N-1}]^T$, where, m=0, 1 ... M−1, is the N length data vector for $m^{th}$ time slot and A is the modulation matrix which can be given as, $$A = [g\ M_1g\ \ldots\ M_{N-1}g|T_1g\ T_1M_1g\ \ldots\ T_1M_{N-1}g|\ \ldots\ |T_{M-1}M_1g\ \ldots\ T_{M-1}M_{N-1}g], \tag{3}$$

where, $g=[g[0]\ g[1]\ \ldots\ g[MN-1]]^T$ is MN length vector which holds the prototype filter coefficients, $$M_l g[n] = g[n] e^{\frac{j2\pi ln}{N}}$$

is the modulation operator and $T_r = g(n-rN)_{MN}$ is the cyclic shift operator.

CP of length $N_{CP}$ is prepended to x. After adding CP, transmitted vector, $x_{cp}$, can be given as, $$x_{cp} = [x(MN-N_{cp}+1:MN);x]. \tag{4}$$

Channel:

Let, $h=[h_0, h_1, \ldots h_{L-1}]^T$ be L length channel impulse response vector, where, $h_i$, for $0 \le i \le L-1$, represents the complex baseband channel coefficient of $(i+1)^{th}$ path [27], which is assumed to be zero mean circular symmetric complex Gaussian (ZMCSC). It is also assumed that channel coefficients related to different paths are uncorrelated. It is considered, $N_{cp} \ge L$. Received vector of length $N_{cp}+NM+L-1$ is given by, $$z_{cp} = h * x_{cp} + v_{cp}, \tag{5}$$

where $v_{cp}$ is AWGN vector of length $MN+N_{cp}+L-1$ with elemental variance $\sigma_v^2$.

Receiver:

The first $N_{cp}$ samples and last L−1 samples of $y_{cp}$ are removed at the receiver i.e. $y=[y_{cp}(N_{cp}+1: N_{cp}+MN)]$. Use of cyclic prefix converts linear channel convolution to circular channel convolution when $N_{cp} \ge L$. The MN length received vector after removal of CP can be written as, $$z = HAd+v, \tag{6}$$

where H is circulant convolution matrix of size MN×MN and v is WGN vector of length MN with elemental variance $\sigma_v^2$. Since H is a circulant matrix, y can be further written as, $$z = W_{MN} \Lambda W_{MN}^H Ad+v, \tag{7}$$

where, $\Lambda = \text{diag}\{\tilde{h}(0), \tilde{h}(1) \ldots \tilde{h}(MN-1)\}$ is a diagonal channel frequency coefficients matrix whose $r^{th}$ coefficient can be given as, $$\tilde{h}(r) = \sum_{s=0}^{L-1} h(s) e^{\frac{j2\pi sr}{MN}}$$

where, r=0, 1 ... MN−1.

In this invention, two stage as well as one stage receiver is considered.

Two Stage Receiver.

For two stage receiver, channel equalized vector, y, can be given as, $$y = W_{MN} \Lambda_{eq} W_{MN}^H z = aAd+b+v, \tag{8}$$

where, $\Lambda_{eq} = \begin{cases} \Lambda^{-1} & \text{for } ZF\ FDE \\ \left[\Lambda^H \Lambda + \frac{\sigma_v^2}{\sigma_d^2} I_{MN}\right]^{-1} \Lambda^H & \text{for } MMSE\ FDE \end{cases}$ where, $v = W_{MN} \Lambda_{eq} W_{MN}^H v$, $$a = \begin{cases} 1 & \text{for } ZF-FDE \\ \frac{1}{MN} \sum_{r=0}^{MN-1} \frac{|\tilde{h}(r)|^2}{|\tilde{h}(r)|^2 + \frac{\sigma_v^2}{\sigma_d^2}} & \text{for } MMSE\ FDE, \end{cases}$$

b is residual interference, given in (9) and $v = W_{MN}\Lambda_{eq}W_{MN}^H v$ is post-processing noise.

$$b = \begin{cases} 0 & \text{for } ZF\ FDE \\ Ad & \text{for } MMSE\ FDE \end{cases} \tag{9}$$

Channel equalized vector, y, is further equalized to remove the effect of self-interference. Estimated data, d, can be given as, $$d = A_{eq} y, \tag{10}$$

where, $A_{eq}$ is GFDM equalization matrix which can be given as, $$A_{eq} = \begin{cases} A^H & \text{for } MF \text{ Equalizer} \\ A^{-1} & \text{for } ZF \text{ Equalizer} \\ [R_v + A^H A]^{-1} A^H & \text{for biased } MMSE \text{ Equalizer} \\ \Theta_{gfdm}^{-1}[R_v + A^H A]^{-1} A^H & \text{for unbiased } MMSE \text{ Equalizer,} \end{cases}$$

for unbiased MMSE Equalizer, where, $R_v=E[vv^H]$ is noise correlation matrix after channel equalization. In the case of AWGN, $$R_v = \frac{\sigma_v^2}{\sigma_d^2} I.$$

For multipath fading channel, $R_v$ is a full matrix since the noise after channel equalization is colored. $\Theta_{gfdm}^{-1}$ is a diagonal bias correction matrix for GFDM-MMSE equalizer, where, $$\Theta_{gfdm} = \text{diag}\left\{\left[\frac{\sigma_v^2}{\sigma_d^2}I + A^H A\right]^{-1} A^H A\right\}.$$

One-Stage Receiver (Joint-MMSE Receiver):

Joint-MMSE equalizer can be of two types, namely, (1) biased-Joint MMSE and (2) unbiased-Joint-MMSE. Equalized data symbol vector, $d_{JP}$, can be given as, $d_{JP}=B_{eq}y$, where, $B_{eq}$ is Joint-MMSE equalizer matrix and can be given as, $$B_{eq} = \begin{cases} \left[\frac{\sigma_v^2}{\sigma_d^2}I + (HA)^H HA\right]^{-1} (HA)^H & \text{for biased Joint– MMSE Equalizer} \\ \Theta^{-1}\left[\frac{\sigma_v^2}{\sigma_d^2}I + (HA)^H HA\right]^{-1} (HA)^H & \text{for unbiased Joint–} \\ & \text{MMSE Equalizer} \end{cases} \quad (12)$$

where, $\Theta^1$ is diagonal bias correction matrix for joint-processing, where, $$\Theta = \text{diag}\left\{\left[\frac{\sigma_v^2}{\sigma_d^2}I + (HA)^H HA\right]^{-1} (HA)^H HA\right\}.$$

Low Complexity GFDM Transmitter:

In this section, low complex GFDM transmitter is presented. A matrix is factorized into special matrices to obtained low complexity transmitter without incurring any assumptions related to GFDM parameters. The stepwise operation of the GFDM transmitter is provided hereunder:

Step 1: Complex valued data symbols corresponding to a particular timeslot and different sub-carriers are modulated to corresponding sub-carrier frequencies using N-point IFFT operation.

Step 2: Modulated data symbols in step 1 are grouped according to sub-carrier numbers, whereby, in each group, step a: Samples are converted into frequency domain using M-point FFT.

step b: Samples computed in 2(a) are multiplied with a precomputed weight.

step c: Samples in 2(b) are converted back into time domain by using M-point IFFT.

Step 3: Samples obtained after step 2 are regrouped according to time slots.

Signal obtained after step 3 is GFDM transmitted signal.

In the following subsections, the design and implementation of the transmitter is explained.

Low Complexity Transmitter Design

The GFDM modulation matrix A can be given as, $$A = P^T U_M D U_M^H P U_N, \quad (13)$$

where, $\overline{D}=\text{diag}\{\overline{\lambda}(0), \overline{\lambda}(1) \ldots \overline{\lambda}(MN-1)\}$ is diagonal matrix, whose $r^{th}$ element can be given as, $$\overline{\lambda}(r) = \sum_{m=0}^{M-1} g\left(mN + \left\lfloor\frac{r}{M}\right\rfloor\right)\omega^{m(r \bmod M)}. \quad (14)$$

and P is a subset of perfect shuffle permutation matrix, which can be defined as, $P=[p_{l,q}]0\leq l,q\leq MN-1$, where the matrix element $p_{l,q}$ can be given as, $$P_{l,q} = \begin{cases} 1 & \text{if } q = lN + \left\lfloor\frac{1}{M}\right\rfloor \\ 0 & \text{otherwise} \end{cases} \quad (15)$$

GFDM transmitted signal, x can be given as, $$x = P^T U_M D U_M^H P U_N d. \quad (16)$$

Lemma 1 Let $\theta=[\theta(0)\ \theta(1)\ldots\theta(MN-1)]^T$ be a MN length complex valued vector. The vector, $\tilde{\theta}=P\theta=[\tilde{\theta}(0)\ \tilde{\theta}(1)\ldots\tilde{\theta}(MN-1)]^T$. The $i^{th}$ element of the vector can be given as, $$\tilde{\theta}(i) = \theta\left((i \bmod M)N + \left\lfloor\frac{i}{M}\right\rfloor\right), 0 \leq i \leq MN-1. \quad (17)$$

The vector, $\overline{\theta}=P^T\theta=[\overline{\theta}(0)\ \overline{\theta}(1)\ldots\overline{\theta}(MN-1)]^T$. The $i^{th}$ element of the vector can be given as, $$\overline{\theta}(i) = \theta\left((i \bmod N)M + \left\lfloor\frac{i}{N}\right\rfloor\right), 0 \leq i \leq MN-1. \quad (18)$$

Figure 3:
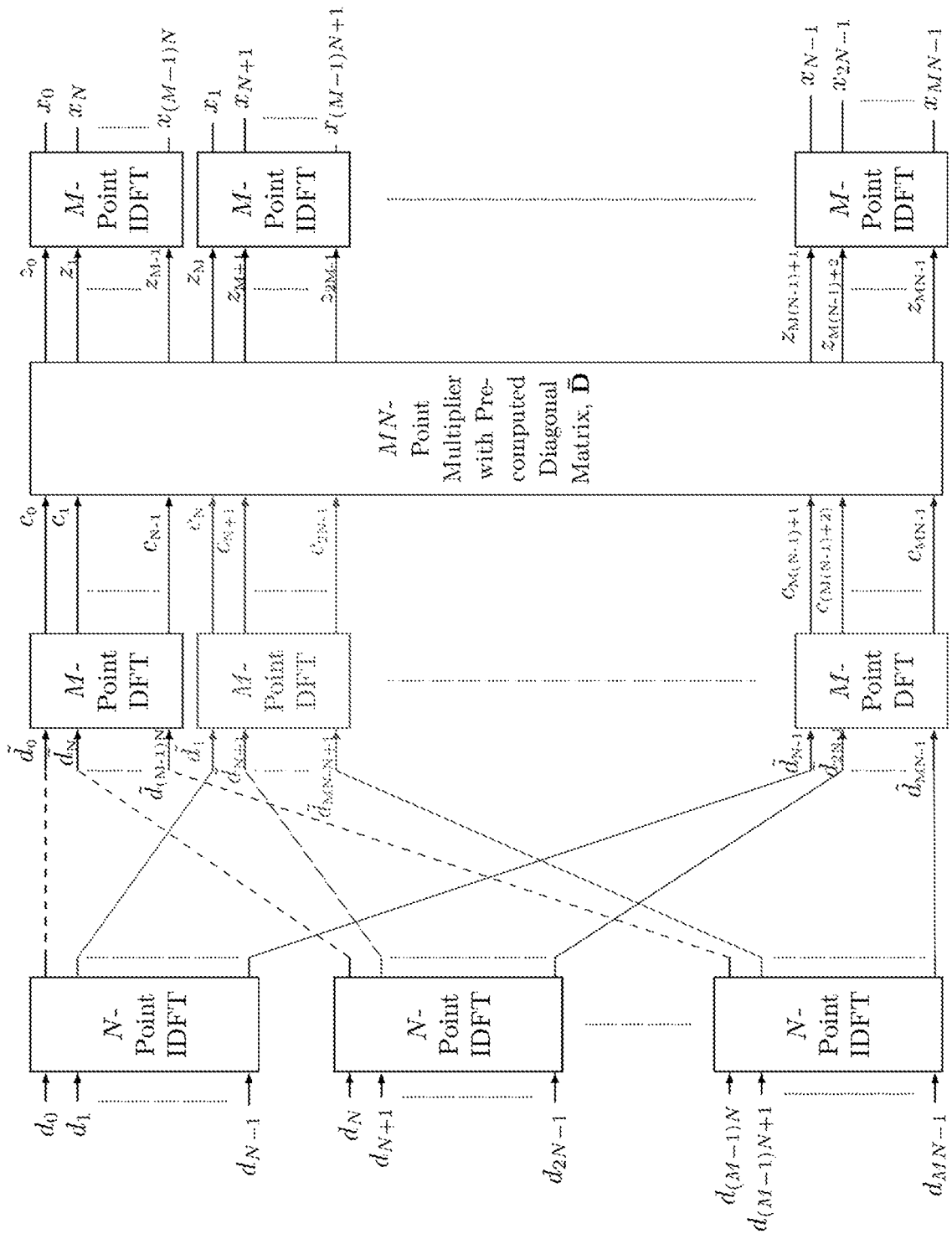
FIG. 3 shows low complexity implementation of GFDM transmitter in accordance with an embodiment of the present invention.
Figure 4:
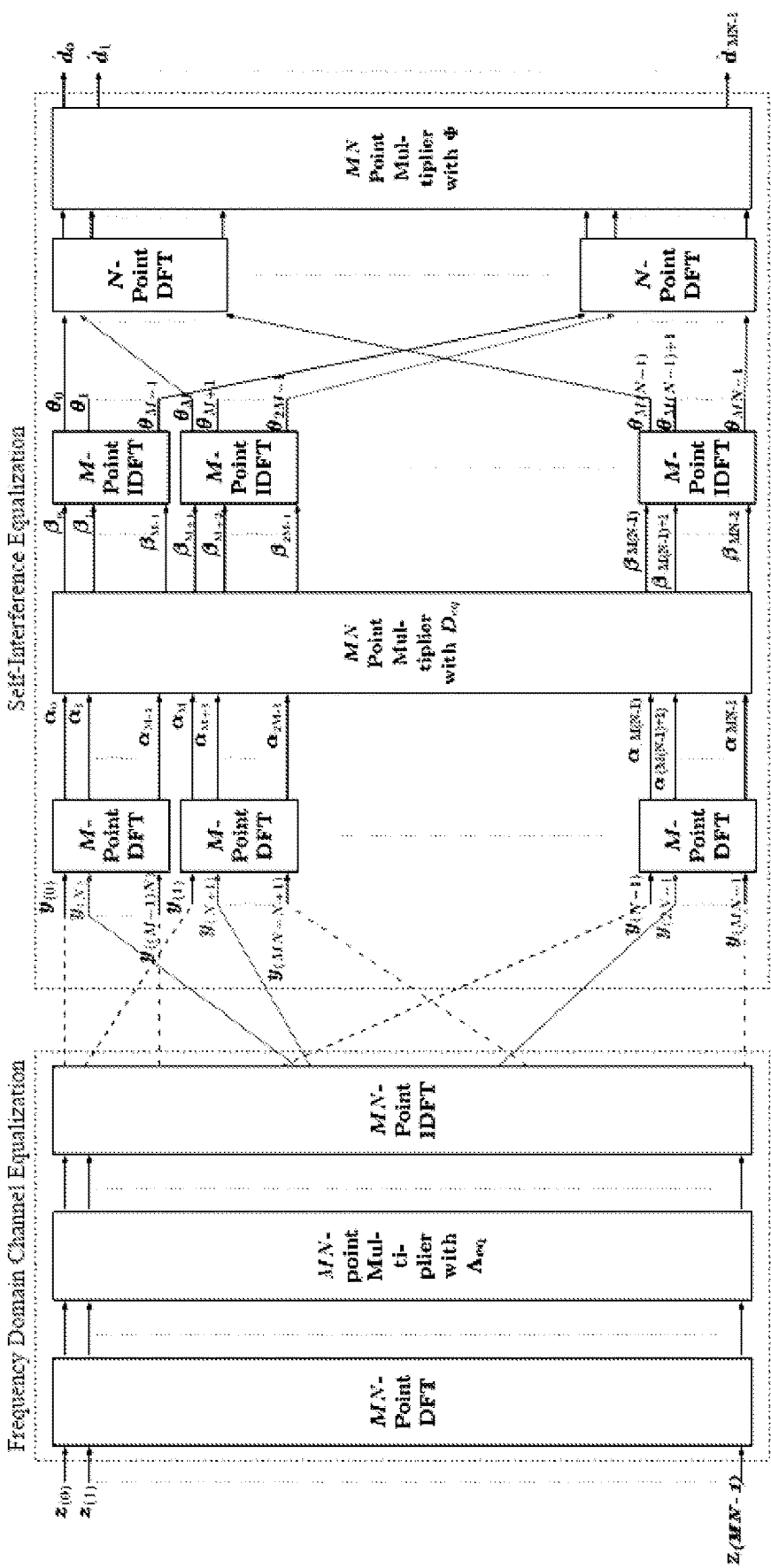
FIG. 4 shows low complexity implementation of GFDM receiver in multipath fading channel in accordance with an embodiment of the present invention.

Low Complexity Transmitter Implementation:

The low complexity transmitter can be obtained using Corollary 1 and Lemma 2. FIG. 3 presents low complexity transmitter implementation.

The vector $e=U_N d$, can be obtained by M, N point IFFT. The vector $\tilde{e}=Pe$ can be obtained by shuffling the vector e using (17). The vector $c=U_M^H \tilde{e}$ can be obtained using N, M-point FFT's. Using (13), the matrix $\overline{D}$, can be pre-computed at the transmitter. The MN length vector, $z=\overline{D}c$, can be obtained by MN-point complex multiplication. The MN length vector, $\tilde{x}=U_M z$ can be implemented using N, M-point IFFT. Finally, the transmitted signal, $x=P^T\tilde{x}$ can be obtained by shuffling $\tilde{x}$ according to (18).

Low Complexity Two Stage GFDM Receiver:

In this section, the low complexity linear GFDM receivers is disclosed i.e. (1) MF (2) ZF and (3) Biased MMSE and (4) Unbiased MMSE. The stepwise operations of the GFDM receivers are provided hereunder:

step 1: Channel equalized samples are grouped according to sub-carrier numbers. A total N groups are made having M samples and for each group, step 1a: Samples in a group are converted into frequency domain using M-point FFT;

step 1b: Samples computed in 1a is multiplied with pre-computed weights.

step 1c: Samples in 1(b) are converted back into time domain by using M-point IFFT.

step 2: samples obtained after step 1 are regrouped according to time slots. A total M groups are made having N samples and for each group step 2a: Samples are converted into frequency domain using N-point FFT;

step 2b: Samples computed in 2a are multiplied with pre-computed weights.

Signal obtained after step 2 is self-interference equalized signal.

Low Complexity GFDM Receiver Design

Receiver in AWGN channel is self-interference equalization. For multipath fading channel, channel equalization is followed by self-interference equalization. Theorem 1 relates to unified low complexity GFDM linear self-interference equalizers. Corollary 1 gives unified implementation of GFDM receivers in AWGN as well as multipath fading channel.

Theorem 1 GFDM equalization matrix $A_{eq}$ can be written in a unified manner as, $$A_{eq} = \Theta U_N^H P^T U_M D_{eq} U_M^H P, \quad (19)$$

where, $D_{eq}$ is a diagonal MN-order matrix, which can be given as, $$D_{eq} = \begin{cases} D^H \text{ for } MF \text{ Equalizer} \\ D^{-1} \text{ for } ZF \text{ Equalizer} \\ [R_v + D^H D]^{-1} D^H \\ \text{ for biased } MMSE \text{ Equalizer} \\ \Theta[R_v + D^H D]^{-1} D^H \\ \text{ for unbiased } MMSE \text{ Equalizer,} \end{cases}$$

and $\Theta = \Theta_{gfdm}^{-1}$ for unbiased MMSE and $\Theta = I_{MN}$ for other equalizers. Further, $\Theta_{gfdm}$ can be given as, $$\Theta_{gfdm} = \frac{1}{MN} \sum_{r=0}^{MN-1} \frac{|\lambda_r|^2}{|\lambda_r|^2 + \frac{\sigma_v^2}{\sigma_d^2}} I_{MN}.$$

Corollary 1 The estimated data, d, can be given as, $$d = \begin{cases} \Theta U_N^H P^T U_M D_{eq} U_M^H Pz \text{ for } AWGN \text{ Channel} \\ \Theta U_N^H P^T U_M D_{eq} U_M^H PW_{MN} \Lambda_{eq} W_{MN}^H z \\ \text{ for Multipath Fading Channel} \end{cases} \quad (20)$$

Low Complexity Receiver Implementation:

The low complexity structure of GFDM self-interference cancellation can be obtained by using Corollary 1 and Lemma 1.

Channel Equalization.

To implement $y^1 = \Lambda_{eq} W_{MN}^H z$, MN-point FFT of z is multiplied with $\Lambda_{eq}$. Finally, MN-point IFFT of $y^1$ is taken to implement $y = W_{MN} y^1$.

Self-Interference Equalization.

The vector y=Py, can be obtained by shuffling the y vector using (16). The MN×1 vector $\alpha = U_M^H y$ can be implemented by using N, M-point IFFT's. The vector $\alpha$ is then multiplied to the diagonal matrix $D_{eq}$ to obtain $\beta$. The vector $\theta = U_M \beta$ can be implemented using N, M-point FFTs. The vector, $\tilde{\theta} = P^T \theta$, can be implemented by shuffling the $\theta$ vector using (17). Now, the vector, $d = U_N \tilde{\theta}$ can be implemented using M, N-point FFTs. Finally, $d = \Theta d$ can be obtained by using MN-point multiplier.

Low Complexity Joint-MMSE Receiver:

Step 1: Received signal is converted into frequency domain using M N-point FFT.

Step 2: Received signal in frequency domain is multiplied with complex valued channel information-based weights and then converted back to time domain using MN-point IFFT.

Step 3: Samples obtained in step 2 are grouped according to subcarrier number. N such groups are formed having M samples each and for each group Step 3a: Samples are converted into frequency domain using M-point FFT and multiplied with pre-computed weights;

Step 4 Samples obtained in step 3a are regrouped according to time slot number. M such groups are formed having N samples and for each group Step 4a: Samples are converted into frequency domain using N-point FFT.

Step 4b: Samples obtained in step 4a are processed as explained in Algorithm 1 or Algorithm 2.

Step 5 Samples obtained after step 4 are regrouped according to sub-carrier number. N such groups are formed having M samples each and for each group, repeat Step 5a Samples are converted back to time domain using M-point IFFT and multiplied with complex weights which are computed using Algorithm 3.

Step 6 Samples obtained after step 5 are regrouped according to time slots to obtain equalized MN-point samples.

Joint MMSE Low Complexity Receiver Design

Theorem 1 The estimated data vector for joint-MMSE receiver, d, can be given as, $$d = \Theta_{JP}^{-1} F_b E U_N^H D^H F_b^H W_{MN} \Lambda^H W_{MN}^H y \quad (21)$$
$$= \Theta_{JP}^{-1} P^T U_M P E U_N^H D^H P^T U_M^H P W_{MN} \Lambda^H W_{MN}^H y (Using Lemma 1)$$

where, $E = \text{diag}\{E_0, E_1, \ldots E_{M-1}\}$, is a MN×MN size block diagonal matrix with blocks of size N×N. A block of E, $$E_u = \left[\frac{\sigma_v^2}{\sigma_d^2} I + C_u\right]^{-1}$$

where, $0 \le u \le M-1$, of size N×N, where, $\Theta_{JP} = \Theta$ for unbiased receiver and $I_{MN}$ for biased MMSE receiver. Further, $C_u$ can be given as, $$C_u = L_u^H \gamma_u L_u, \ 0 \le u \le M-1, \quad (22)$$

where, $L_u$ is a circulant N×N matrix which can be represented in terms of its first column as, $L_u = \text{circ}\{l_u(0), l_u(1), \ldots l_u(N-1)\}$, where, $p^{th}$ element of the first column can be given as, $$l_u(p) = \frac{1}{N} \sum_{r=0}^{N-1} \lambda(uN+r) e^{\frac{j2\pi(-p)r}{N}} e^{\frac{-j2\pi ur}{MN}},$$

$0 \le u \le M-1$, and, $\gamma_u$ is a N×N diagonal matrix which can be given as, $$\gamma_u = \text{diag}\{|\tilde{h}(u)|^2, |\tilde{h}(M+u)|^2 \ldots |\tilde{h}((N-1)M+u)|^2\},$$
$$0 \le u \le M-1. \quad (23)$$

Further, $\Theta$ can be given as, $$\Theta = I_M \otimes S, \quad (24)$$

where, $$S = \frac{1}{M} \sum_{u=0}^{M-1} \text{diag}\{\tilde{E}_u\},$$

where, $$\tilde{E}_u = \left[\frac{\sigma_v^2}{\sigma_d^2}I_N + C_u\right]^{-1} C_u$$

is a N×N matrix, $0 \leq u \leq M-1$.

Proof. The theorem can be proved using the fact that $(HA)^H HA$ is block circulant matrix with blocks of size N×N.

The implementation of joint-MMSE receiver based on (15), requires the inversion of M number of, N×N size $$\left[\frac{\sigma_v^2}{\sigma_d^2}I + C_u\right]$$

matrices. The direct implementation of this inversion requires $O(MN^3)$. To see the possibility of further reduction in complexity, $E_u$ is factorized for $0 \leq u \leq M-1$, Factorization of $E_u$ for $0 \leq u \leq M-1$:

Using (16), $E_u$ can be written as, $$E_u = \left[\frac{\sigma_v^2}{\sigma_d^2}I + L_u^H \Upsilon_u L_u\right]^{-1} = L_u^{-1}\left[\Upsilon_u + \frac{\sigma_v^2}{\sigma_d^2}(L_u L_u^H)^{-1}\right]^{-1}(L_u^H)^{-1}.$$

Since $L_u$ is a circulant matrix, it can be further factorized as, $$L_u = W_N R_u W_N^H,$$

where, $R_u$ is a diagonal matrix of order N, which can be computed as, $R_u = W_N^H L_u W_N$. Using this, (19) can be written as, $$E_u = W_N R_u^{-1} W_N^H \Phi_u W_N (R_u^H)^{-1} W_N^H,$$

where, $$\Phi_u = \mho_u^{-1} = \left[\Upsilon_u + \frac{\sigma_v^2}{\sigma_d^2}(L_u L_u^H)^{-1}\right]^{-1}.$$

Using the properties of circulant matrices, it can be shown that $L_u L_u^H$ is a circulant matrix because $L_u$ is a circulant matrix. Further, $L_u L_u^H = W_N |R_u|^2 W_N^H$. Using this, $(L_u L_u^H)^{-1} = W_N |R_u|^{-2} W_N^H$. Hence, $\mho_u$ is a circulant-plus-diagonal matrix. It can be easily seen that elements of $\gamma_u$ and $|R_u|^{-2}$ are positive. It can be concluded that $\mho_u$ is a positive definite matrix too.

Since $\mho_u$ is a positive definite matrix, inversion of $\mho_u$ can be computed using Conjugate Gradient (CG) algorithm. CG algorithm gives exact solution in N iterations. Hence a direct implementation of joint-MMSE receiver can be obtained using CG method. In each iteration, a matrix-vector multiplication is required. In our case this matrix is a circulant-plus-diagonal matrix. Using the properties of circulant matrix, matrix-vector multiplication can be implemented using N-point FFT and IFFT. Thus, direct implementation of joint-MMSE receiver requires $O(MN^2 \log_2 N)$ computations.

It has been showed that to implement the receiver, the most computationally complex operation is to invert N-order $\mho_u$ matrix, $0 \leq u \leq M-1$. First the structure of $\mho_u$ matrix is investigated. The low complexity bias correction is also investigated.

Structure of $\mho_u$ matrix, $0 \leq u \leq M-1$:

Using the properties of circulant matrices, it can be shown that diagonal values of $(L_u L_u^H)^{-1}$ are equal and can be given as, $\text{diag}\{(L_u L_u^H)^{-1}\} = \mu_u I_N$, where, $\mu_u$ can be given as, $$\mu_u = \frac{\sum_{r=0}^{N-1}[|R_u|^{-2}]_{r,r}}{N}.$$

Next, two matrices are defined, $$\Delta_u = \frac{\sigma_v^2}{\sigma_d^2}\{(L_u L_u^H)^{-1} - \mu_u I_N\}$$

and $$\mathcal{Z}_u = \Upsilon_u + \frac{\sigma_v^2}{\sigma_d^2}\mu_u I_N.$$

Using this, $\mho_u$ can be written as, $\mho_u = [\mathcal{Z}_u + \Delta_u]$.

It can be seen that $\mathcal{Z}_u$ is a diagonal matrix and $\Delta_u$ is a circulant matrix with zero diagonal values. Using the properties of circulant matrix, $\|\Delta_u\|^2$ can be given as, $$\|\Delta_u\|^2 = \left(\frac{\sigma_v^2}{\sigma_d^2}\right)^2 \text{trace}\{R_u^2\}.$$

$E[\|\mathcal{Z}_u\|^2]$ can be approximated as, $$E[\|\mathcal{Z}_u\|^2] \approx N\left(\left(1 + \frac{\sigma_v^2}{\sigma_d^2}\mu_u\right)^2 + 1\right).$$

It is observed that $E[\|\mathcal{Z}_u\|^2]$ is approximately independent of assumed channel power delay profile.

Next, the ratio of power in $\Delta_u$ to the power in $\mathcal{Z}_u$ is analyzed. To do so, $\rho =$ $$\frac{1}{M}\sum_{u=0}^{M-1} E_h\left[\frac{\|\Delta_u\|}{\|\mathcal{Z}_u\|}\right]$$

is defined. Urban micro (UMi) channel is taken and Monte-Carlo simulations are persomed to compute $$E_h\left[\frac{\|\Delta_u\|}{\|\mathcal{Z}_u\|}\right].$$

Figure 5A:
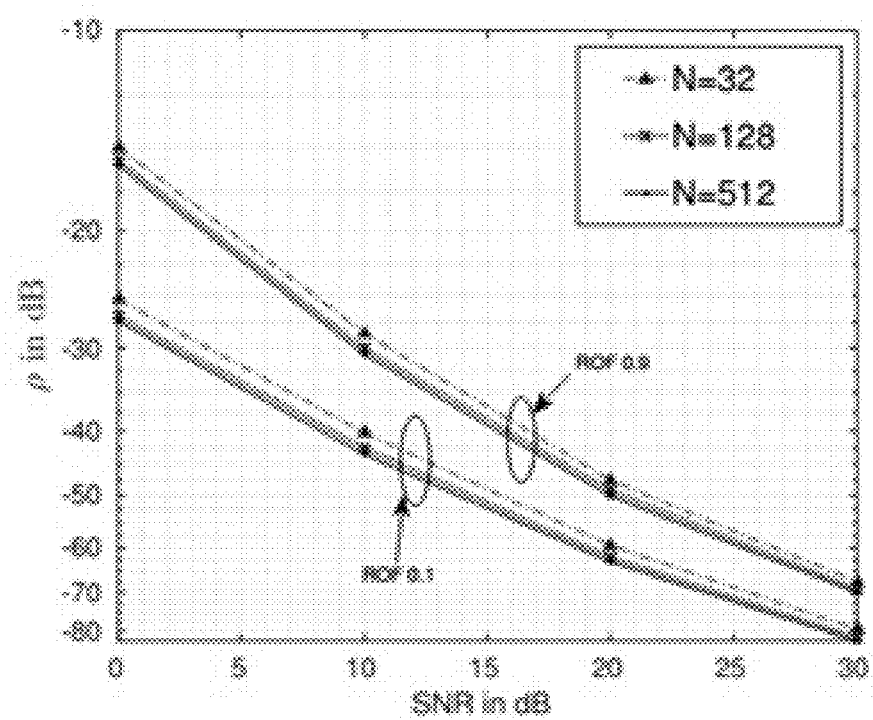
FIGS. 5A to 5D show ratio of power in constituent matrices of $\Phi_u$ i.e.
Figure 5B:
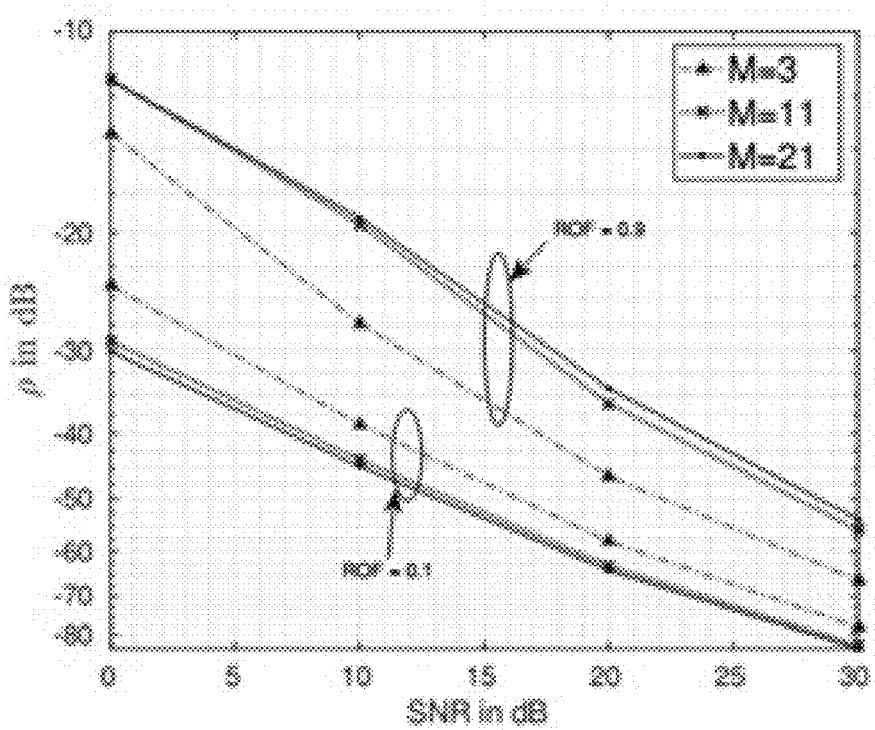
Figure 5C:
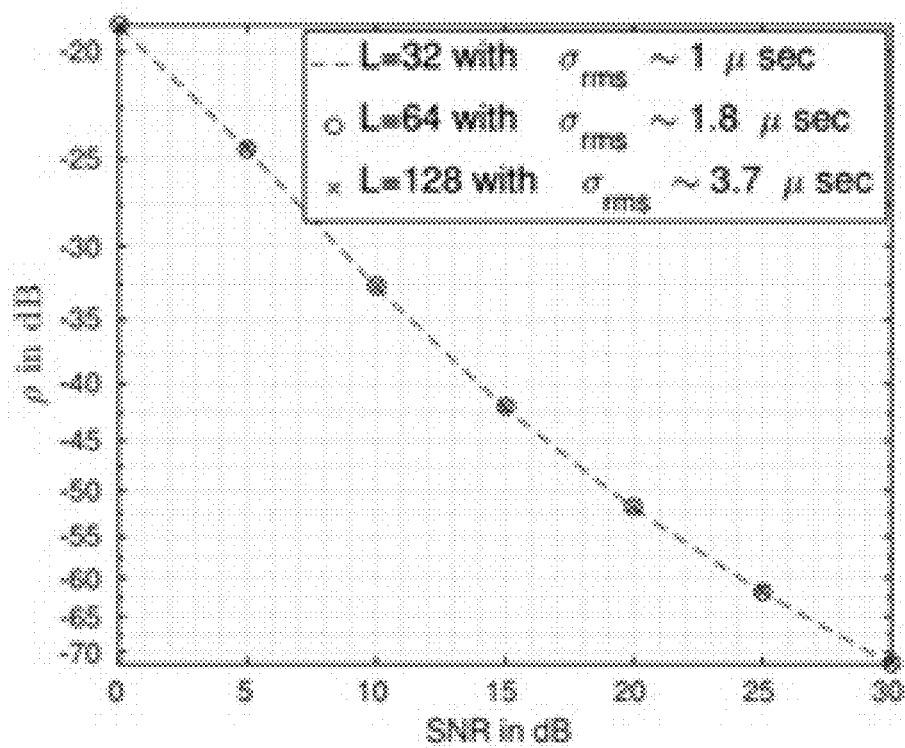
Figure 5D:
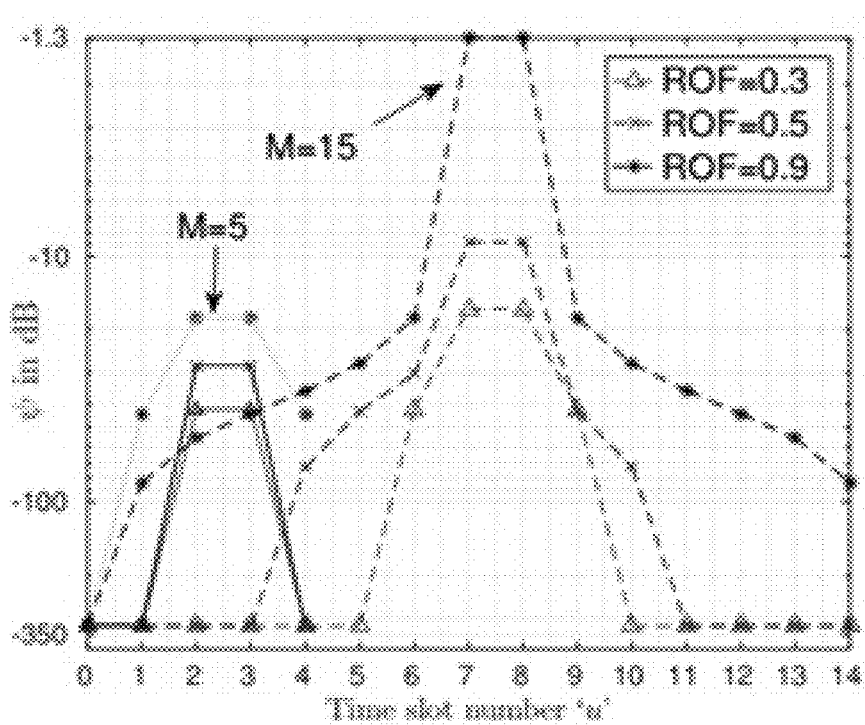

It is further averaged over u to obtain $\rho$. Plot of $\rho$ versus SNR is given in FIG. 5A for $N \in \{32, 128, 512\}$, $M=3$ and ROF $\in \{0.1, 0.9\}$. It is observed that $\rho$ decreases with SNR and increases with ROF. For same SNR and ROF value, it decreases with increasing value of N. FIG. 5B plots $\rho$ against SNR for $M \in \{3, 11, 21\}$, $N=16$ and ROF $\in \{0.1, 0.9\}$. It can be seen that $\rho$ decreases with SNR and increases with ROF value. For low ROF values, $\rho$ is decreases with M and for high ROF values, it increases with M. To see the effect of h, three different channel lengths of following uniform power delay profile (PDP) is considered. The value of $\rho$ is plotted against SNR in FIG. 5C for channel lengths L=[16, 32,64] representing different rms delay spread $\sigma_{rms} \approx [1, 1.8, 3.7]$ µs respectively. It can be observed that ρ is same for different channel lengths. Hence, it can be concluded that power in $\mathcal{Z}_u$ is much higher than the power in $\Delta_u$ irrespective of channel propagation conditions.

$$\psi = E_h \left[ \frac{\|\Delta_n\|}{\|\mathcal{Z}_u\|} \right]$$

is defined. In FIG. 5D, the value of ψ against $u \in [0M-1]$ and ROF=0.3,0.5,0.9 for N=64, M=5.15 and SNR=10 dB is plotted. It is observed that value of ψ is highest for middle two values of u. In case of M=15 and ROF=0.9, the power in $\Delta_u$ for u=7.8 is comparable to the power in $\mathcal{Z}_u$.

Taylor Series Method for Computing $\Phi_u = \mho_u$, $0 \le u \le M-1$:

It can be concluded from the previous section that the power in $\mathcal{Z}_u$ is much higher than the power in $\Delta_u$ when both M and ROF have value. Therefore, Taylor series expansion of $\Phi_u$ can be used for other situations. In such cases, $\Phi_u \approx \mathcal{Z}_u^{-1} - \mathcal{Z}_u^{-1} \Delta_u \mathcal{Z}_u^{-1} + \mathcal{Z}_u^{-1} \Delta_u \mathcal{Z}_u^{-1} \Delta_u \mathcal{Z}_u^{-1} + \ldots$. Also, using (19) and (21), the following expression can be reached $\Delta_u = W_N R_u W_N^H$, where $$R_u = \frac{\sigma_v^2}{\sigma_d^2} |R_u|^{-2} - \mu_i I_N.$$

Therefore, $$\Phi_u \approx \mathcal{Z}_u^{-1} [I_N - W_N R_u W_N^H \mathcal{Z}_u^{-1} + W_N R_u W_N^H \mathcal{Z}_u^{-1} W_N R_u W_N^H \mathcal{Z}_u^{-1} + \ldots]. \quad (25)$$

Algorithm to Multiply E in (14) with Complex Valued Vector Using Taylor Series Method:

$\kappa = U_N^H D^H F_b^H W_{MN} \Lambda^H W_{MN}^H y$, is considered to be an intermediate MN length complex valued vector in (14). Now to compute ρ=Eκ, another intermediate vector in (14), E can computed by putting (23) in (20). Algorithm 1 discuss a low complexity algorithm to multiply ρ=Eκ using Taylor Series expansion. This algorithm is used to develop low complexity receiver structure. Matrices vectors and scalars which are only related GFDM parameters (do not depend on the channel) can be precomputed at the receiver. Hence, it is assumed that, the knowledge of $R_u$, $|R_u|^{-2}$, $(R_u^H)^{-1}$, $R_u^{-1}$, $\tilde{R}_u$, $\mu_u$ for $0 \le u \le M-1$. Also, it is assumed that the knowledge of $$\frac{\sigma_v^2}{\sigma_d^2}$$

which can be computed at the receiver and which is known from the channel estimation. $K_T+1$ is the number of terms in (24) i.e. the number of iterations for step 7 to step 9 is $K_T$.

---

Algorithm 1
Computation of $\varrho$ = Eκ Using Taylor Series Method

---

1: Precomputed: $R_u$, $|R_u|^{-2}$, $(R_u^H)^{-1}$, $R_u^{-1}$, $\tilde{R}_u$, $\mu_u$, $\frac{\sigma_v^2}{\sigma_d^2}$ and Λ for $0 \le u \le M - 1$
2: for u = 0 : M − 1 do
3:   Compute : $Y_u$ using (16)

---

Algorithm 1
Computation of $\varrho$ = Eκ Using Taylor Series Method

---

4:   Compute: $\mathcal{Z}_u = Y_u + \frac{\sigma_v^2}{\sigma_d^2} \mu_u I_N$

5:   Compute : $\varsigma_u = W_N (R_u^H)^{-1} W_N^H \kappa_u$
6:   Take : $t^{(0)} = \varsigma_u$
7:   for k = 1 : $K_T$ do
8:     $t^{(k)} = W_N \tilde{R}_u W_N^H \mathcal{Z}_u^{-1} t^{(k-1)}$
9:   end for 10:   Compute: $\varrho_u^{(1)} = \mathcal{Z}_u^{-1} \sum_{k=0}^{K_T} t^{(k)}$ 11:   Compute : $\varrho_u = W_N R_u^{-1} W_N^H \varrho_u^{(1)}$
12: end for
13: $\varrho = [\varrho_0 \, \varrho_1 \ldots \varrho_{M-1}]^T$
14: return $\varrho$

---

Low Iteration Conjugate Gradient (CG) Method for Computing $\Phi_u = \mho_u^{-1}$, $0 \le u \le M-1$ It is established earlier, that $\mho_u$ is a positive definite matrix. So, $\mho_u \mho_u \varsigma_{u\,u} = \kappa_u$ can be computed using CG algorithm. CG algorithm gives exact solution in N iterations. To reduce the complexity further Jacobi precoded CG method is used i.e. the system $\mathcal{Z}_u^{-1} \mho \mho_u \varsigma_{u\,u} = \mathcal{Z}_u^{-1} \kappa_U$ is solved. Thus, $[I_N + \mathcal{Z} \Delta_u] \mho_u \varsigma_{u\,u} = \mathcal{Z}_u^{-1} \kappa_u$ is solved using CG method. Different iteration count is also used for different values of u since $$\frac{\|\Delta_u\|}{\|\mathcal{Z}_u\|}$$

changes with u (as illustrated in FIG. 5D). When $$\frac{\|\Delta_u\|}{\|\mathcal{Z}_u\|}$$

is small, number of iterations can be kept small. When $$\frac{\|\Delta_u\|}{\|\mathcal{Z}_u\|}$$

is large, number of iteration is made large to obtain low errors.

Algorithm to Multiply E in (14) with Complex Valued Vector Using CG Method:

Algorithm 2 discuss a low complexity algorithm to multiply ρ=Eκ using CG method. This algorithm is used to develop low complexity receiver structure. $k_C$ is considered to be a M-length vector which holds iteration counts for different values of u. Same as in Algorithm 1, matrices, vectors and scalars which are only related GFDM parameters (do not depend on the channel) are assumed to be precomputed at the receiver.

Algorithm 2
Computation of $\varrho = E\kappa$ using conjugate gradient (CG) method 1: Precomputed: $R_u, |R_u|^{-2}, (R_u^H)^{-1}, R_u^{-1}, \tilde{R}_u, \mu_u, \frac{\sigma_v^2}{\sigma_d^2}$ and $\Lambda$ for $0 \le u \le M-1$
2: for u = 0 : M − 1 do
3:   Compute : $Y_u$ using (17)
4:   Compute: $\mathcal{Z}_u = Y_u + \frac{\sigma_v^2}{\sigma_d^2}\mu_u I_N$
5:   Compute : $\varsigma_\kappa = W_N(R_u^H)^{-1}W_N^H \kappa_u$
6:   Compute : $\varsigma_\kappa^{(1)} = \mathcal{Z}_u^{-1}\varsigma_\kappa$
7:   Take : $w(0) = \varsigma_\kappa^{(1)}$
8:   Compute : $e(0) = \varsigma_\kappa^{(1)} - [I_N + \mathcal{Z}_u^{-1}W_N\tilde{R}_u W_N^H]w(0)$
9:   Take : $p(0) = e(0)$
10:   for k = 0 : $k_C(u)$ do
11:     Compute : $\alpha(k) = [I_N + \mathcal{Z}_u^{-1}W_N\tilde{R}_u W_N^H]p(k)$
12:     Compute: $\mho(k) = \frac{e^H(k)e(k)}{p^H(k)\alpha(k)}$
13:     Compute : $w(k + 1) = w(k) + \mho(k)p(k)$
14:     Compute : $e(k + 1) = e(k) − \mho(k)\alpha(k)$
15:     Compute: $\tau(k) = \frac{e^H(k+1)e(k+1)}{e^H(k)e(k)}$
16:     $p(k + 1) = e(k + 1) + \tau(k)p(k)$
17:   end for
18:   Take : $\varrho_u^{(1)} = w(k_C(u))$
19:   Compute : $\varrho_u = W_N R_u^{-1} W_N^H \varrho_u^{(1)}$
20: end for
21: $\varrho = [\varrho_0 \varrho_1 \ldots \varrho_{M-1}]^T$
22: return $\varrho$ Approximation of Bias Correction Matrix Θ

To compute Θ, diag$\{\tilde{E}_u\}$, 0≤u≤M−1, is required (see (17)). Let, $Q_u$=diag$\{C_u\}$ and $S_u$=$C_u$−$Q_u$, using (17) $\tilde{E}_u$ can be given as, $$\tilde{E}_u = \underbrace{\left[\frac{\sigma_v^2}{\sigma_d^2}I_N + Q_u + S_u\right]^{-1}}_{J_u}[Q_u + S_u] = [J_u + S_u]^{-1}[Q_u + S_u].$$

It can be shown that $\|Q\| \gg \|S_u\|$. This implies that $\|J_u\| \gg \|S_u\|$. Hence, $[J_u + S_u]^{-1}$ can be approximated using Taylor series. $\tilde{E}_u$ can be approximated as, $\tilde{E}_u \approx [J_u^{-1} - J_u^{-1}S_u J_u^{-1}][Q_u + S_u]$. Using this diag$\{\tilde{E}_u\}$ can be approximated as, diag$\{\tilde{E}_u\} \approx J_u^{-1}Q_u$ − diag$\{J_u^{-1}S_u J_u^{-1}S_u\}$. Since $\|J_u\| \gg \|S_u\|$ as well as $\|Q_u\| \gg \|S_u\|$, it can be easily shown that $\|J_u^{-1}Q_u\| \gg \|$diag$\{J_u^{-1}S_u J_u^{-1}S_u\}\|$. So, diag$\{\tilde{E}_u\}$ can be further approximated as, $$\text{diag}\{\tilde{E}_u\} \approx J_u^{-1}Q_u$$

Now, $Q_u$=diag$\{C_u\}$ to be computed for computation of diag$\{\tilde{E}_u\}$ in (25). It can be shown, that only three elements in a column of $L_u$ matrix is dominant, which are $l_u(0), l_u(1)$ and $l_u(N−1)$. Other elements have comparatively lesser power by at least 40 dB. Hence $L_u$ matrix is approximated as, $L_u$=circ$\{l_u(0), l_u(1), 0 \ldots 0 l_u(N−1)\}$. Using this approximation, (15) and (16), the diagonal elements of $Q_u$ can be approximated as, $$[Q_u]_{s,s} \approx \sum_{r=0,1,N-1} |l_u(r)|^2 |\tilde{h}(u + ((r + s)\text{mod}N)M)|^2, \quad (26)$$

where 0≤s≤N−1 and 0≤u≤M−1. Now, using (17), (25) and (26), Θ can be approximated as, $$\Theta \approx \frac{1}{M}I_M \otimes \sum_{u=0}^{M-1} J_u^{-1}Q_u. \quad (27)$$

Algorithm to Compute $\Theta_{JP}$

Algorithm 3 explains low complexity computation of $\Theta_{JP}$. $|l_u(r)|^2$ is assumed for r=0,1, N−1 and 0≤u≤M−1 is precomputed at the receiver which requires storage of 3M real values for unbiased receiver.

Algorithm 3
Computation of $\Theta_{JP}$

1: if biased receiver then
2:   $\Theta_{JP} = I_{MN}$
3: else
4:   Precomputed $|l_u(r)|^2$ for r = 0, 1, N − 1 and $0 \le u \le M-1. \frac{\sigma_v^2}{\sigma_d^2}$ and $\Lambda$
5:   for u = 0 : M − 1 do
6:     Compute : $Q_u$ using (26)
7:     Compute: $J_u = \left[\frac{\sigma_v^2}{\sigma_d^2}I_N + Q_u\right]$
8:     Compute : $J_u^{-1}Q_u$
9:   end for
10:   Compute : $\Theta_{JP} = \Theta$ using (27)
11: end if
12: return $\Theta_{JP}$ Joint-MMSE Low Complexity Structure
To implement, $$y = W_{MN}\Lambda^H W_{MN}^H y$$

IFFT$_{MN}$ of the product of diagonal matrix $\Lambda^H$ with (FFT$_{MN}$ of y) is computed. To implement, $\xi = P^T U_M^H Py$, the vector, y is first shuffled according to (17) and then passed through N FFT$_M$ whose output is again shuffled according to (18). To implement, $\kappa = U_N^H D^H \xi$, the vector, $\xi$, is multiplied with $D^H$ using MN-point multiplier whose output is then passed through M FFT$_N$. The vector, $\kappa$ is then passed through M N-order square matrix inversion block to obtain $\rho = E\kappa$ using Algorithm 1 or 2. In the last, the vector, $\kappa$ is first shuffled according to (17) and then passed through N, IFFT$_M$ whose output is again shuffled according to (18) and multiplied to $\Theta_{JP}$ to obtain estimated data, d. $\Theta_{JP}$ can be computed using Algorithm 3.

Testing
Two Stage Receiver

Monte-Carlo simulation is performed for GFDM system which comprises of the proposed transmitter and two-stage receiver. Each point in the BER curve is calculated for 107 transmission bits.

BER of the proposed low complexity transceiver in multipath fading channel is plotted in FIG. 7. The proposed receivers do not incur any performance loss over direct implementations. The proposed MMSE receiver shows significant BER performance gain over other GFDM receivers. For ROF value of 0.1, the proposed MMSE receiver gives the best performance. MMSE receiver achieves SNR gain of 4 dB over OFDM at BER of 10−5. This SNR gain over OFDM is due to higher frequency resolution of GFDM [Ref: N. Michailow, M. Matthe, I. Gaspar, A. Caldevilla, L. Mendes, A. Festag, and G. Fettweis, \Generalized Frequency Division Multiplexing for 5th Generation Cellular Networks," IEEE Transactions on Communications, vol. 62, no. 9, pp. 3045{3061, September 2014]. MMSE receiver also achieves SNR gain of 2.5 dB over our proposed ZF receiver and SIC receiver in [Ref: A. Farhang, N. Marchetti, and L. E. Doyle, \Low complexity GFDM receiver design: A new approach," in 2015 IEEE International Conference on Communications (ICC), June 2015, pp. 4775-4780.] at BER of 4×10−6. For ROF value of 0.9, the proposed MMSE receiver shows a SNR gain of 5 dB over our proposed ZF receiver at BER of 10−4. BER of SIC receiver in [Ref: Ref: A. Farhang, N. Marchetti, and L. E. Doyle, \Low complexity GFDM receiver design: A new approach," in 2015 IEEE International Conference on Communications (ICC), June 2015, pp. 4775-4780.] floors at 10−2 and has SNR loss of 15 dB over the proposed MMSE receiver.

TABLE 1

Simulation Parameter for two stage receiver

| Parameters | Value |
| --- | --- |
| Number of Subcarriers N | 128 |
| Number of Timeslots M | 8 |
| Mapping | 16 QAM |
| Pulse shape | Raise Cosine (RC) |
| Sub-carrier Bandwidth | 15 KHz |
| Channel | Extended Typical Urban (ETU) [Ref: M. Series, "Guidelines for evaluation of radio interface technologies for IMT-advanced", Report ITU, no. 2135-1, 2009.] |
| Carrier Frequency | 2.4 GHz |
| Maximum Doppler shift | 100 Hz |
| RMS delay Spread | 1 micro second |
| Channel Equalization | MMSE FDE |

Joint MMSE Receiver

In this section, BER performance of proposed receiver is presented in the multipath channel. Table 8 presents the simulation parameters. The multipath channel Urban Micro (UMi) [26] with 20 taps is considered, whose channel delay and channel power are [0 10 15 20 35 40 45 50 55 200 205 250 330 440 515 530 580 590 625 730] ns and [−6.7 −4.9 −7.1 −1.9 −6.3 −3 −5.2 −7 −7.5 −10.8 −5.2 −4.9 −9.2 −15.5 −12.4 −16.9 −12.7 −23.5 −22.1 −23.6] dB, respectively. The CP is chosen long enough to accommodate the wireless channel delay spread. A coded system with code rate of 0.5 is assumed. Convolution code is used with constraint length of 7 and code generator polynomial of 171 and 133. A random interleaver having length equal to $K_{qam}MN$ is considered, where $K_{qam}$ is number of bits in a QAM symbol. Soft maximum likelihood (ML) decoding is implemented at the receiver. Each point in our BER curve is calculated for $10^8$ transmission bits.

TABLE 2

Simulation Parameters for Joint-MMSE Receiver

| Parameters | Value |
| --- | --- |
| Number of Subcarriers N | 128 |
| Number of Timeslots M | 5 |
| Mapping | 16 QAM |

TABLE 2-continued

Simulation Parameters for Joint-MMSE Receiver

| Parameters | Value |
| --- | --- |
| Pulse shape | Raise Cosine (RC) |
| Sub-carrier Bandwidth | 15 KHz |
| Channel | Umi [Ref: M. Series, "Guidelines for evaluation of radio interface technologies for IMT-advanced", Report ITU, no. 2135-1, 2009.] |
| Carrier Frequency | 2.4 GHz |
| Maximum Doppler shift | 6.67 Hz |
| RMS delay Spread | 0.38 micro second |
| Decoding | Soft Maximum Likelihood (ML) |

For soft ML decoding, post processing SNR of MMSE receiver output is required. It is straight forward to compute SNR ($\Gamma(1)$) for $l^{th}$ symbol which can be given as, $$\Gamma(l) = \frac{1}{[\Theta]_{l,l} - 1}.$$

As discussed, $\Theta$ is computed for correcting the bias of MMSE equalization outputs using Algorithm 3. $\Theta$ is periodic with N. Thus $\Gamma(l+mN)=\Gamma(l)$, where, $m\in[0, M-1]$. This means that computation of F requires additional N complex multiplications.

The BER performance of the proposed receiver is computed with the direct ones in Michailow et al., "Generalized Frequency Division Multiplexing for 5th Generation Cellular Networks." for N=128, M=5 i.e. in TI scenario for ROF value of 0.3 and 0.9 in FIGS. 8A and 8B respectively. For CG based method, $k_C$=[1410104] is considered i.e. $K_C$=5. When $K_T$=0, the proposed TS based receiver shows 0.5 dB SNR loss at the BER of $2\times10^{-6}$ for ROF value of 0.3. Whereas for ROF value of 0.9, the proposed receiver with, $K_T$=0, has 1 dB SNR degradation at the BER of $10^{-5}$. When $K_T$=2 and $K_C$=5, It is observed that there is no notable degradation in BER as compared to direct implementation for ROF values of 0.3 as well as 0.9. The bias correction provides SNR gain of 1 dB and 0.8 dB at BER of $10^{-5}$ for ROF value of 0.3 and 0.9 respectively without any observable increase in complexity. It can be concluded that approximations made in Algorithm 1 and Algorithm 2 have no noticeable effect on BER performance. The proposed bias correction has BER benefits without any observable increase in complexity.

What is claimed is:
1. A generalized frequency division multiplexing (GFDM) transceiver system comprising:
   a GFDM transmitter with multiple sub-carriers and timeslots having an inverse fast Fourier transform (IFFT)based modulator for modulating data corresponding to a particular timeslot and different sub-carriers to corresponding sub-carrier frequencies and thereby generating transmittable GFDM data signal as

$$x[n] = \frac{1}{\sqrt{N}} \sum_{m=0}^{M-1} \sum_{k=0}^{N-1} d_{m,k} g[n - mN]_{MN} e^{\frac{j2\pi nk}{N}}$$

for N sub-carriers and M timeslots, where g(n), n=0, 1, . . . , MN−1 is MN length filter response and $d_{m,k}\in C$, m=0, 1, . . . , M−1, k=0, 1, . . . , N−1 is a quadrature amplitude modulation (QAM) modulated data symbol, whereby the transmitting GFDM data signal is critically sampled Inverse Discrete Gabor Transform (IDGT) of d by using the IDGT matrix factorization with Modulation Matrix, A as, $$A = G \times U_N = \begin{pmatrix} \Psi_0 & \Psi_{M-1} & \ldots & \Psi_1 \\ \Psi_1 & \Psi_0 & \ldots & \Psi_2 \\ \vdots & \vdots & \ddots & \vdots \\ \Psi_{M-1} & \Psi_{M-2} & \ldots & \Psi_0 \end{pmatrix} \begin{pmatrix} W_N & & \\ & \ddots & \\ & & W_N \end{pmatrix}$$

where, $\Psi_m = \text{diag}\{g[mN], g[mN+1], \ldots, g[mN+N-1]\}$ for $0 \le m \le M-1$, is N×N diagonal matrix and $W_N$ is N×N normalized inverse discrete Fourier transform (IDFT) matrix;

a multipath frequency selective fading GFDM channel having uncorrelated channel coefficients corresponding to different paths for transmitting the GFDM data signal; and a GFDM receiver configured to operate with said multipath frequency selective fading channel involving channel equalization followed by self-interference equalization to receive the transmitted GFDM data signal and thereby de-modulate the GFDM data signal to obtain the data, wherein the GFDM transmitter includes:

N-point IFFT for N-point IFFT operation to modulate the data corresponding to the particular timeslot and the different sub-carriers into the corresponding sub-carrier frequencies;

wherein shuffling physical connections in the N-point IFFT for grouping the modulated data to sub-carrier numbers, and, in each group, the data is converted into frequency domain using M-point fast Fourier transform (FFT) and multiplied with a precomputed weight and thereafter converted back into time domain by using M-point IFFT; and wherein shuffling physical connections in the M-point IFFT for grouping the data according to time slots and generate transmittable GFDM data signal.

2. The generalized frequency division multiplexing (GFDM) transceiver system as claimed in claim 1, wherein the uncorrelated channel coefficients corresponding to different paths for transmitting the modulated GFDM data signal constitutes channel impulse response vector given as $h = [h_0, h_1, \ldots h_{L-1}]^T$ where L is channel length and $h_i$, for $0 \le i \le L-1$, represents complex baseband channel coefficient of $(i+1)^{th}$ path, which is assumed to be zero mean circular symmetric complex Gaussian whereby received vector of length $N_{CP} + NM + L - 1$ (for $N_{CP} \ge L$) is given by, $$Z_{cp} = h * X_{cp} + v_{cp}$$

where $v_{cp}$ is an adaptive white Gaussian noise (AWGN) vector of length $MN + N_{CP} + L - 1$ with elemental variance $\sigma^2_v$.

3. The generalized frequency division multiplexing (GFDM) transceiver system as claimed in claim 1, wherein the GFDM receiver includes a two staged receiver or a joint-minimum mean squared error (MMSE) Receiver whereby, the data obtained from the received GFDM data signal by involving channel equalization followed by self-interference equalization.

4. The generalized frequency division multiplexing (GFDM) transceiver system as claimed in claim 3, wherein the two-staged receiver is configured for
grouping channel equalized received GFDM data signal according to sub-carrier numbers followed by:
converting samples of each group into frequency domain using M-point FFT operation;
multiplying the converted samples with pre-computed weights by multiplier; and
converting back the multiplied samples into time domain by using M-point IFFT operation;
regrouping the converted samples according to time slots followed by converting samples of each group into frequency domain using N-point FFT operation; and
multiplying the converted samples with pre-computed weights by multiplier to obtain self-interference equalized data signal.

5. The generalized frequency division multiplexing (GFDM) transceiver system as claimed in claim 3, wherein the joint-MMSE receiver is configured for:
converting the equalized received GFDM data signal into frequency domain by using MN-point FFT operation;
multiplying the received signal in the frequency domain with complex valued channel information-based weights and then converting back to time domain using MN-point IFFT operation;
grouping the time domain converted signal according to subcarrier number followed by:
converting the samples of each group into frequency domain using the M-point FFT operation; and
multiplying the converted samples with pre-computed weights;
regrouping the converted samples according to time slots followed by converting samples of each group into frequency domain using the N-point FFT operation;
processing the converted samples following Algorithm 1;
regrouping the processed samples according to sub-carrier number followed by:
converting the samples of each group to time domain using the M-point IFFT operation; and
multiplying the converted samples with complex weights computed using Algorithm 2; and
regrouping the multiplied samples according to time slots to obtain equalized MN-point samples.

6. The generalized frequency division multiplexing (GFDM) transceiver system as claimed in claim 5, wherein the Algorithm 1 is configured to enable development of the joint-MMSE receiver including low complexity multiplication to obtain $\rho = E\kappa$ using Taylor Series expansion.

7. The generalized frequency division multiplexing (GFDM) transceiver system as claimed in claim 5, wherein the Algorithm 2 is configured to enable development of the joint-MMSE receiver including low complexity multiplication to obtain $\rho = E\kappa$ using Conjugate Gradient (CG) method.

* * * * *